United States Patent [19]

Mehta

[11] Patent Number: 4,480,923
[45] Date of Patent: Nov. 6, 1984

[54] ROTARY PROCESSORS AND SEALS

[75] Inventor: Pradip S. Mehta, West Haven, Conn.

[73] Assignee: USM Corporation, Farmington, Conn.

[21] Appl. No.: 532,165

[22] Filed: Sep. 14, 1983

[51] Int. Cl.$^3$ ............................................. B01F 7/10
[52] U.S. Cl. ..................................... 366/99; 277/59;
   277/134; 366/139; 366/307; 366/315
[58] Field of Search ...................... 366/52, 69, 96–99,
   366/136, 293, 262–265, 315, 302–307, 336–340;
   264/85, 349, 176 C; 425/224, 374, 466, 86, 207,
   376; 415/90, 101, 170 R, 170 B; 72/60, 262,
   270; 277/59, 124, 134, 135, 15, 53, 67–69, DIG.
   8

[56] References Cited

U.S. PATENT DOCUMENTS

| | | | |
|---|---|---|---|
| 3,331,101 | 7/1967 | Thomas | 277/134 X |
| 4,207,004 | 6/1980 | Hold et al. | 366/97 |
| 4,289,319 | 9/1981 | Hold et al. | 366/97 |
| 4,300,842 | 11/1981 | Hold et al. | 366/315 |

Primary Examiner—Timothy F. Simone
Attorney, Agent, or Firm—Frances J. P. Craig

[57] ABSTRACT

Novel rotary processors including sealing means to control leakage of pressure and/or material between processing passages which are maintained at significantly different pressure levels. The processors comprise a rotatable element carrying a plurality of annular channels and a stationary element providing a coaxial closure surface operationally arranged with the channels to provide enclosed processing passages. Each passage includes inlet means, outlet means and a channel blocking member all associated with the stationary element and arranged and adapted so that material fed to the inlet can be carried forward by the rotatable channel walls to the blocking member for discharge from the passage. The passages are interconnected by material transfer grooves formed in the closure surface.

A sealing groove is carried by the rotor surface portion between two adjacent passages maintained at significantly different pressure levels, such as by evacuating one of the two adjacent passages, and is open to the clearance between the rotor and the closure surface. A gate at the inlet to the downstream passage pressurizes the material in the transfer passage interconnecting the two passages, and forces pressurized material into the sealing groove as it passes under the transfer groove. An obstructing surface extending into the sealing groove at the transfer groove reinforces the pressure in the sealing groove so that the material in the sealing groove contacts the closure surface about the entire circumference of the sealing groove, forming a continuous live O-ring seal in the clearance between the passages.

6 Claims, 12 Drawing Figures

ROTARY PROCESSORS AND SEALS

BACKGROUND OF THE INVENTION

(1) The Field of the Invention

This invention relates to processing apparatus and methods. More precisely, this invention relates to rotary processors having improved sealing between processor regions at significantly different pressures.

(2) Description of the Prior Art

Rotary processors are known to the art. Details relating to such processors are described in U.S. Pat. Nos. 4,142,805; 4,194,841; 4,207,004; 4,213,709; 4,227,816; 4,255,059; 4,289,319; 4,300,842; 4,329,065; 4,389,119; 4,402,616; 4,411,532; 4,413,913 and 4,421,412.

Essential elements of the basic individual processing passage of rotary processors disclosed in the above Patents comprise a rotatable element carrying at least one processing channel and a stationary element providing a coaxial closure surface operationally arranged to form with the channel an enclosed processing passage. The stationary element has an inlet for feeding material to the passage and an outlet for discharge of material from the passage. A member providing a material blocking and material collecting end wall surface is also associated with the stationary element and arranged near the outlet. The end wall surface is adapted to block movement of material fed to the passage and to coact with the moving channel walls to establish relative movement between the blocked material and the moving channel walls. This coaction permits material in contact with the moving walls to be dragged forward to the end wall surface for collection and/or controlled processing and/or discharge.

As disclosed in the above Patents, the processing passages present a highly versatile processing capability. The passages are adaptable for performing such processing operations as melting, mixing, pressurizing, pumping, devolatilizing and homogenizing, among others, as well as adding ingredients to or withdrawing ingredients from materials processed in the passage.

U.S. Pat. Nos. 4,227,816; 4,213,709; 4,389,119; 4,402,616 and 4,411,532 relate to multi-stage rotary processors which include a plurality of processing stages, each having one or more processing passages. Material transfer passages or grooves are formed in the closure surface of the stationary element and arranged to transfer material from a passage (or passages) of one stage to a passage (or passages) of another stage.

U.S. Pat. Nos. 4,329,065 and 4,413,913 relate to apparatus and method, respectively, for devolatilizing materials. In accordance with the apparatus and method disclosed therein, viscous material is fed to the processing passage and, near the inlet, the material is collected at a spreading element and is spread as thin films on the sides of the rotating channel walls. A void space is provided downstream of the spreader and a port is provided communicating with the void space so that volatile materials can be withdrawn from the surfaces of the thin films carried past the void space. The thin films are carried forward through the passage toward the material collecting end wall surface where the films are scraped from the walls and collected for discharge.

U.S. Pat. Nos. 4,207,004; 4,289,319 and 4,300,842 relate to novel seals for controlling the leakage of viscous liquid material between closely spaced apart relatively moving coaxial annular surfaces, particularly those of rotary processors. U.S. Pat. No. 4,207,004 discloses an annular pumping channel on one of the surfaces and an annular liquid retaining channel on the other surface which cooperate to resist the flow of viscous leakage liquid. U.S. Pat. No. 4,289,319 discloses a seal including nested, truncated conical members of thin, stiffly-resilient material interposed in sealing relation between the surfaces. U.S. Pat. No. 4,300,842 discloses a plurality of helical channels on one of the surfaces to resist the flow of leakage liquid between the surfaces. However, none of the above Patents addresses the problem of providing effective sealing to prevent leakage of non-viscous, e.g. gaseous, material (pressure leakage) between passages of a rotary processor which are maintained at significantly different pressure levels, such as by drawing a vacuum in one of the passages.

This invention is directed to improved rotary processors having a novel configuration which provides special advantages in terms of sealing between processing passages which are maintained at significantly different pressure levels.

BRIEF SUMMARY OF THE INVENTION

The rotary processors of this invention comprise a rotatable element carrying at least two annular channels and a stationary element providing a coaxial closure surface spaced apart from the rotor surface by a close clearance and operationally arranged with the channels to provide at least first and second enclosed processing passages. The first processing passage includes an inlet associated with the stationary element for receiving viscous material to be processed in the passage. The second processing passage has an outlet associated with the stationary element for discharging processed material from the passage. Each passage includes a blocking member associated with the stationary element which provides an end wall surface for the passage. The blocking members are arranged and adapted so that material fed to the passages can be carried forward by the rotatable channel walls to the end wall surfaces where movement of the carried forward material is blocked and the blocked material is collected for discharge from the passages. A material transfer groove is formed in the closure surface of the stationary element and positioned near the end wall surface of the first passage to interconnect the first and second processing passages so that material blocked and collected in the first passage can be transferred to the second passage. Additionally, the processor is operated under conditions which provide a significant pressure differential between the first and second passages. For example, vacuum source may be arranged and adapted for operational communication with one, partially filled passage. Alternatively, a partially filled passage may involve the generation of relatively low pressures while an adjacent passage may be designed to generate extremely high pressures, such as for discharge of processed material from the processor.

The rotary processors of this invention provide novel sealing means to control leakage of pressure and/or material between processor passages at different pressure levels. An annular sealing groove, carried by the portion of the rotor surface between the channels and extending about the entire circumference of the rotor, is arranged to pass under the transfer groove so that the groove is filled by some of the viscous material from the transfer groove. Means are arranged in communication with the transfer groove to assure substantially complete filling of the transfer groove, and to generate pressure in the viscous material in the transfer groove to assure substantially complete filling of the sealing groove with pressurized material from the transfer groove. Additional means are provided to maintain the sealing groove completely full of pressurized material so that this material contacts the closure surface over the entire circumference of the sealing groove, thereby creating a live O-ring seal to control leakage of pressure and/or material between the passages of the processor.

Details relating to the novel rotary processors of this invention as well as the advantages derived from such processors, will be more fully appreciated from the Detailed Description of the Preferred Embodiments taken in connection with the Drawings.

BRIEF DESCRIPTION OF THE DRAWINGS

The invention will be described in connection with the attached drawings in which.

DETAILED DESCRIPTION OF THE PREFERRED EMBODIMENTS

Figure 1:
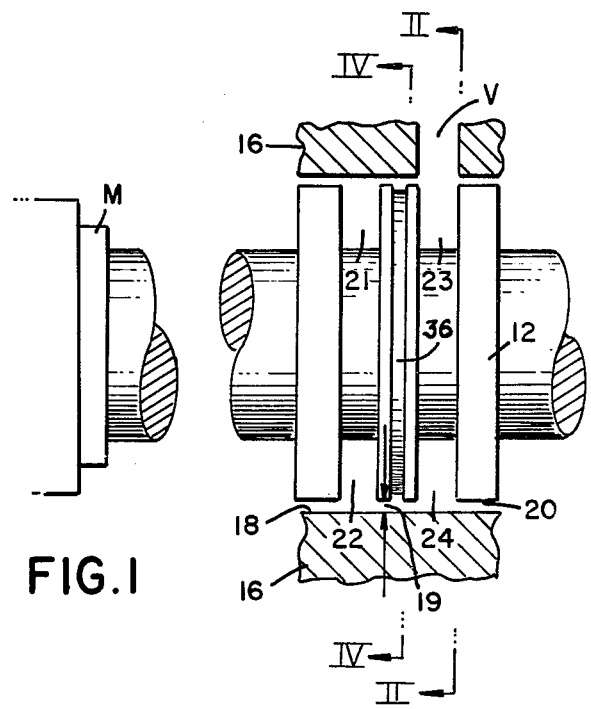
FIG. 1 is a simplified cross-sectional view of a rotary processor of the invention including novel sealing means.

Referring first to FIG. 1, the novel processor of this invention includes a rotatable element comprising a rotor 12 which rotates within a stationary element comprising a housing 16. Rotor 12 carries at least two annular channels 21 and 23, extending inwardly from rotor surface 20. Means for rotating rotor 12 are designated M, since such means are of any suitable type commonly used for rotating extruders or similar apparatus for processing viscous or plasticated materials, and are well known in the art. Housing 16 of the stationary element provides coaxial closure surface 18 cooperatively arranged with surface 20 of rotor 12 to form with channels 21 and 23 enclosed processing passages 22 and 24, the illustrative first and second processing passages, respectively, of the processor. A vacuum means for maintaining a vacuum within partially filled passage 24 is shown as V (FIGS. 1 and 2) thereby providing a significant pressure differential between passages 22 and 24. Suitable vacuum means include those of the type commonly used for maintaining a vacuum in devolatilizing apparatus such as the devolatilizing sections of screw extruders and in rotary processors such as those described in above-referenced U.S. Pat. Nos. 4,329,065 and 4,413,913, and in commonly owned, co-pending U.S. patent application Ser. No. 532,156, filed on the same day as this Application by P. S. Mehta and L. N. Valsamis. Alternatively, other means (not shown) may be provided for maintaining a significant pressure differential between the passages.

Figure 2:
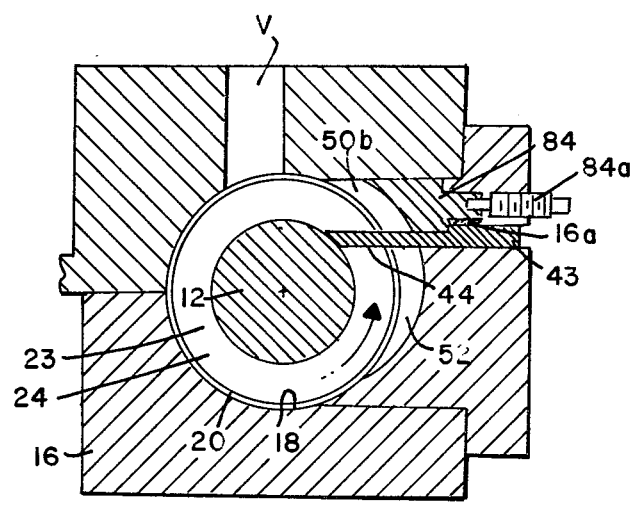
FIG. 2 is a simplified cross-sectional view of a processing passage of the rotary processor of FIG. 1, taken along line II—II of FIG. 1.
Figures 3, 4:
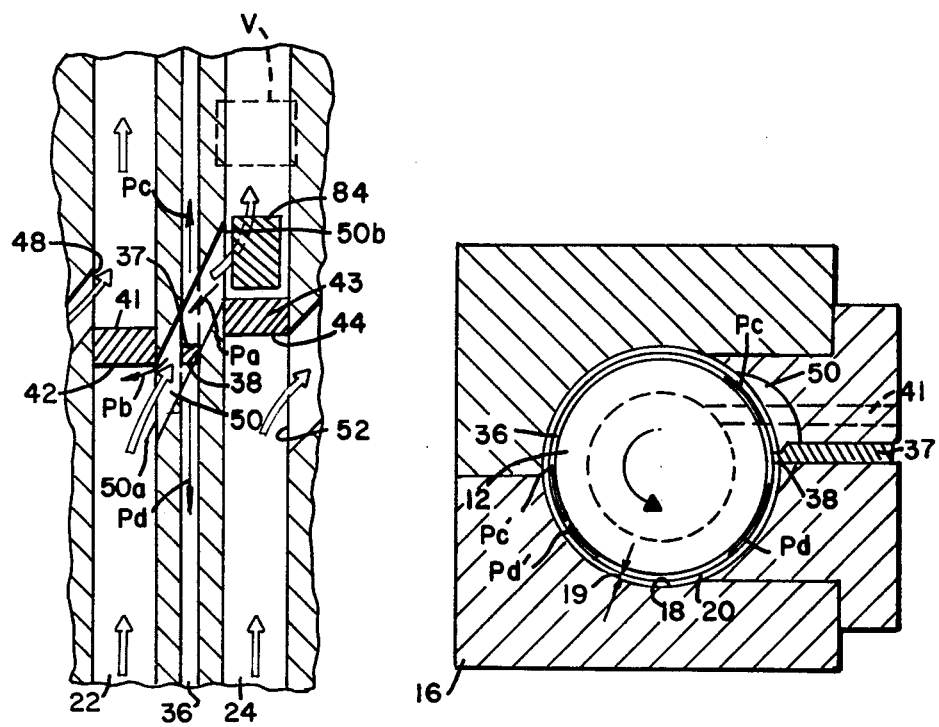
FIG. 3 is a simplified schematic view of the interconnection of the passages of the rotary processor of FIG. 1 by means of a transfer groove, with larger arrows indicating the flow direction of viscous material from one passage to another and smaller arrows indicating pressurization of material by the novel sealing means.
FIG. 4 is a simplified cross-sectional view of a sealing groove of the rotary processor of FIG. 1, taken along line IV—IV of FIG. 1.

As shown in FIG. 3, material transfer groove 50 (formed in closure surface 18) interconnects passages 22 and 24. Passage 22 (FIG. 3) includes inlet 48 and outlet 50a (both formed in closure surface 18) and end wall surface 42 provided by blocking member 41 (associated with housing 16) and arranged to block and collect material processed in passage 22 for discharge from the passage through outlet 50a. Passage 24 (FIGS. 2 and 3) includes inlet 50b and outlet 52 (also formed in closure surface 18) and end wall surface 44 provided by blocking member 43 (also associated with housing 16) and arranged to block and collect material processed in passage 24 for discharge from the passage through outlet 52. Transfer groove 50 (FIG. 3) provides outlet 50a of passage 22 and inlet 50b of passage 24, and is arranged to transfer material discharged from passage 22 to passage 24.

In operation, viscous material from outside the processor or from an upstream passage or passages of the processor enters passage 22 through inlet 48, as illustrated in FIG. 3, in which the larger arrows represent the movement of material through the processor. The material is carried or dragged through passage 22 by the rotation of channel 21 (FIG. 1), and is processed in first passage 22 and collected as a recirculating pool of material at end wall 42 (FIG. 3) for discharge from the passage. The processing in the first passage may consist of melting, conveying, homogenizing, pressurizing, devolatilizing, etc. or a combination of these. The illustrated first passage, passage 22, is a representative passage, and may be modified to perform the desired processing function. The collected viscous material is discharged from the passage through outlet 50a and transferred to second passage 24 through transfer groove 50. Material enters second passage 24 through inlet 50b and is carried or dragged through passage 24 by the rotation of channel 23 (FIGS. 1 and 2). Material processed in passage 24 (FIGS. 2 and 3) is collected as a recirculating pool of material at end wall 44 and discharged from the passage through outlet 52 for discharge from the processor or for transfer to a downstream passage or passages of the processor.

As shown in FIGS. 1, 2 and 3, passage 24 is a low pressure passage relative to passage 22, since it is arranged in communication with vacuum means V. This differential in pressure existing between passages 22 and 24 presents a serious problem of leakage of pressure and/or material between the passages. The present invention provides novel sealing means to prevent this leakage problem. Turning first to FIG. 1, the sealing means of this invention comprises an annular sealing groove 36 formed in surface 20 of rotor 12 between channels 21 and 23 and open to clearance 19 between rotor surface 20 and closure surface 18. The shape of sealing groove 36 can vary and may be rectangular, circular, semi-circular or angular.

As shown in FIG. 4 and illustrated schematically in FIG. 3, sealing groove 36 is open to transfer groove 50 over a portion of its length. As rotor 12 rotates, sealing groove 36 passes under transfer groove 50 where it is substantially completely filled with some of the material from the transfer groove. In the practice of the invention, it is important that transfer groove 50 be maintained substantially full so that leakage of pressure and/or material through transfer groove 50 is prevented or at least minimized. It is equally important that the material filling transfer groove 50 be under sufficient pressure so that any portion of sealing groove 36 passing under transfer groove 50 will be filled with viscous material or be maintained substantially filled with viscous material. Accordingly, means are provided to maintain transfer groove 50 substantially full during operation and to provide sufficient pressure to fill sealing groove 36 with some of the material in transfer groove 50.

Means to achieve these functions is shown in FIGS. 2 and 3 as control gate 84. As shown, control gate 84 passes through opening 16a (FIG. 2) in housing 16 and extends radially into inlet 50b. Control gate 84 may be arranged to be adjustable from outside the processor to constrict inlet opening 50b to a preselected degree, such as by adjusting screw 84a (FIG. 2). Thus control gate 84 provides a capability for selectively adjusting the pressure within transfer groove 50 to maintain transfer groove 50 substantially completely full during operation. Accordingly, the positioning of control gate 84 can be changed so long as the capability is achieved. For example, control gate 84 may be positioned to extend into the transfer groove between inlet 50b and sealing groove 36, or may be positioned to extend into channel 23 downstream of and near inlet 50b.

Figure 5:
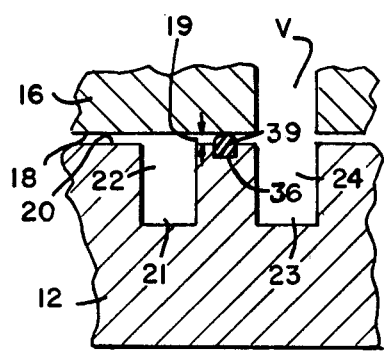
FIG. 5 is a simplified cross-sectional view of a portion of the rotary processor of FIG. 1, illustrating the effect of pressurizing the material in the sealing groove.

Control gate 84, shown in FIGS. 2 and 3, is adjustable to constrict inlet 50b to pressurize the material upstream of inlet 50b and to provide complete filling of transfer groove 50 to control vacuum leakage through transfer groove 50. This pressurization is represented by smaller arrow $P_a$ in FIG. 3. This pressure is transmitted to the material collected at end wall 42, as shown by arrow $P_b$ (FIG. 3). Thus control gate 84 also may be used to control the size of and the pressure within the pool of material collected at end wall 42. The material collected at end wall 42 is further pressurized by the dragging action of rotating channel 21 on the viscous material in passage 22, as described in above-referenced Pat. Nos. 4,142,805 and 4,194,841. Additionally, the pressure in transfer groove 50 urges more material into sealing groove 36 causing pressurization of the viscous material in sealing groove 36 as it passes under the transfer groove. Control gate 84 may thus be adjusted to assure complete filling of sealing groove 36 and to provide control of the pressure within the material entering sealing groove 36 from transfer groove 50. This transmittal of pressure to sealing groove 36 as it passes the transfer groove is represented by arrow $P_c$ in FIGS. 3 and 4. The pressurization of the viscous material in sealing groove 36 urges the material radially outward to contact closure surface 18, as shown in FIG. 5, forming live O-ring seal 39 between surfaces 18 and 20 and preventing the leakage of pressure through clearance 19 between the passages in the pressurized portion of sealing groove 36. In many cases the live O-ring seal created by pressurization of the material in groove 36 from the pressurized material in transform groove 50 is sufficient to provide effective sealing in clearance 19 between passages 22 and 24. However, with certain materials and under certain processing conditions the material forming live O-ring seal 39 can experience a gradual decrease in pressure as the material is carried away from transfer groove 50 by sealing groove 36 due to leakage of the material from groove 36 to passages 22 and/or 24. Thus the pressure represented by arrow $P_c'$ in FIG. 4 may be less that that represented by arrow $P_c$, gradually decreasing in the direction of the arrows. As the material is carried further from transfer groove 50, the pressure within the material may eventually decrease to a level at which the live O-ring seal may be breached permitting a leak at that point between passages 22 and 24.

In accordance with the preferred practice of the invention, means may be provided for positively maintaining an effective live O-ring seal about the entire circumference of rotor surface 20 between passages 22 and 24. Such means is shown in FIGS. 3 and 4 as member 37, which is arranged to further pressurize material carried in sealing groove 36. As shown, member 37 is associated with housing 16 and extends into sealing groove 36 to provide obstructing surface 38 for blocking material in the sealing groove so that back pressure is generated in the material in the sealing groove upstream of obstructing surface 38. Pressurizing member 37 preferably is positioned near the more upstream side wall of transfer groove 50 (relative to the direction of rotation), as shown in FIGS. 3 and 4, so that pressurized material may be collected at obstructing surface 38 and discharged into transfer groove 50.

The material carried by sealing groove 36 is blocked by and collected at obstructing surface 38 provided by pressurizing member 37. As more material is dragged by groove 36 toward obstructing surface 38, further pressure is generated in the material in sealing groove 36. The transmission of this further pressure upstream through groove 36 is indicated by arrows $P_d$ and $P_d'$ (FIGS. 3 and 4). As the pressure ($P_d$ and $P_d'$) transmitted against the direction of rotation from obstructing surface 38 and the pressure ($P_c$ and $P_c'$) transmitted in the direction of rotation from the transfer groove (and controlled by control gate 84, FIGS. 2 and 3) reinforce one another, a continuous live O-ring seal, 39 (FIG. 5), is maintained about the entire circumference of sealing groove 36, providing effective sealing to control leakage about the entire circumference of rotor surface 20 between passages 22 and 24. Preferably, obstructing surface 38 is arranged to fully block the passage of material in sealing groove 36, but alternatively, may be arranged to permit some material to be carried past pressurizing member 37, if desired. Material obstructed and collected at obstructing surface 38 is discharged from the sealing groove to transfer groove 50, providing control of residence time and of degradation of material in sealing groove 36.

In the processor illustrated in FIGS. 1-5, the pressure in second passage 24 is significantly lower than that in first passage 22, but the novel sealing means described above will provide an equally effective seal between first and second passages in which the pressure in the first passage is either significantly lower or significantly higher than that in the second passage.

Figures 6, 7:
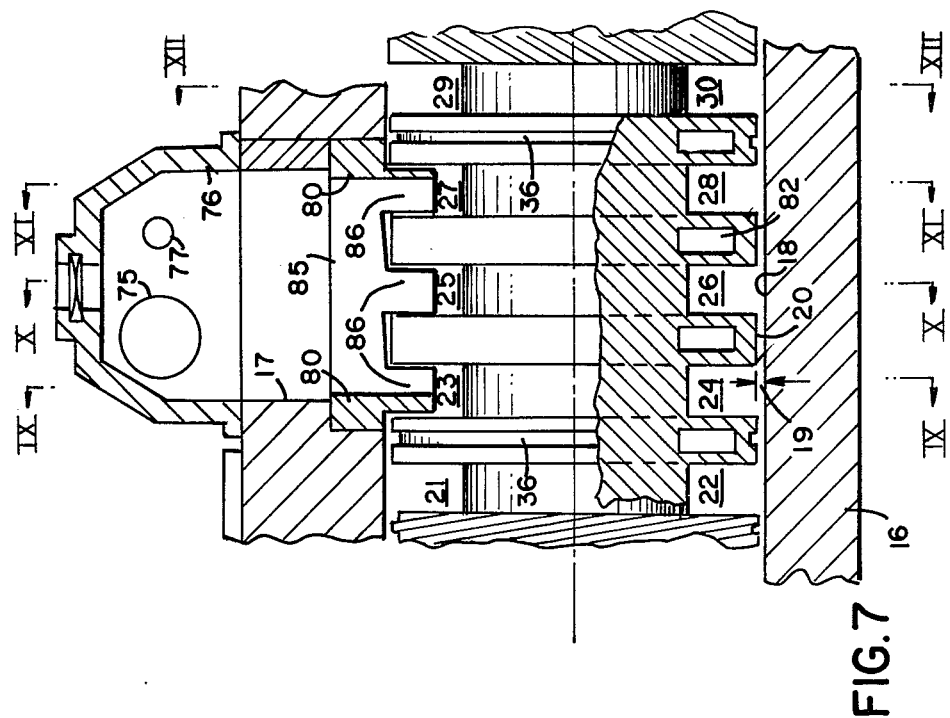
FIG. 6 is a simplified schematic view of the interconnection of the passages of a rotary processor of this invention and includes an alternate embodiment of the novel sealing means, with larger arrows indicating the flow direction of viscous material from one passage to another and smaller arrows indicating pressurization of material by the novel sealing means.
FIG. 7 is a simplified cross-sectional view of a rotary processor of the invention including a devolatilizing stage and the novel sealing means.

Although pressurizing member 37 and obstructing surface 38 (FIGS. 3 and 4) provide especially preferred means for maintaining an effective "Live O-Ring" seal about the entire circumference of the rotor surface between passages 22 and 24, other means for maintaining an effective seal are possible. For example, FIG. 6 illustrates a seal according to the invention in which helical grooves 40 generate further pressure in sealing groove 36 about the entire circumference of rotor surface 20 to maintain an effective seal between passages 22 and 24. Seals including helical grooves 40 as the means for maintaining an effective live O-ring seal are described in detail in commonly owned copending U.S. patent application Ser. No. 532,157, filed on the same day as this application by P. S. Mehta and L. N. Valsamis. Helical grooves 40 are formed in rotor surface 20 of rotor 12 adjacent both sides of sealing groove 36 and are spaced about the entire circumference of surface 20. Helical grooves 40 are open at one end to sealing groove 36 and extend from the sealing groove toward passage 22 and toward passage 24 at acute angles with respect to the direction of rotation. As rotor 12 rotates, helical grooves 40 (as well as sealing groove 36) pass under transfer groove 50 in a manner similar to that described above for sealing groove 36 and illustrated in FIGS. 3 and 4. In operation, some of the pressurized material from transfer groove 50 substantially completely fills helical grooves 40 and contacts closure surface 18 in a manner similar to that described above for sealing groove 36. The coaction of stationary closure surface 18 and rotating, helical grooves 40 on the material in the helical grooves urges the material toward sealing groove 36, increasing the pressure on the material in the sealing groove about its entire circumference and reinforcing the contact between closure surface 18 and the live O-ring sealing material carried by sealing groove 36. Control gate 84 (FIG. 6) may be adjusted to control the pressure at which material enters the sealing groove and helical grooves, thus providing effective sealing to control pressure and/or material leakage about the entire circumference of the rotor between passages 22 and 24. Helical grooves 40 may be used to reinforce the live O-ring seal either as a substitute for or in conjunction with pressurizing member 37 and obstructing surface 38 described above.

FIGS. 7-12 illustrate an especially preferred embodiment of the present invention. FIGS. 7-12 show a rotary processor including a devolatilizing stage of three passages positioned between two passages external to the devolatilizing stage. As shown in FIG. 7, rotor 12 carries a plurality of channels forming passages which are designed for performing various processing functions. Processing passage 22, formed with channel 21, provides a feed passage which is designed to receive viscous material fed to the processor. Devolatilizing passages 24, 26 and 28, formed with channels 23, 25 and 27 respectively, provide the devolatilizing stage. Passage 30 (channel 29) provides a mixing stage.

Figure 8:
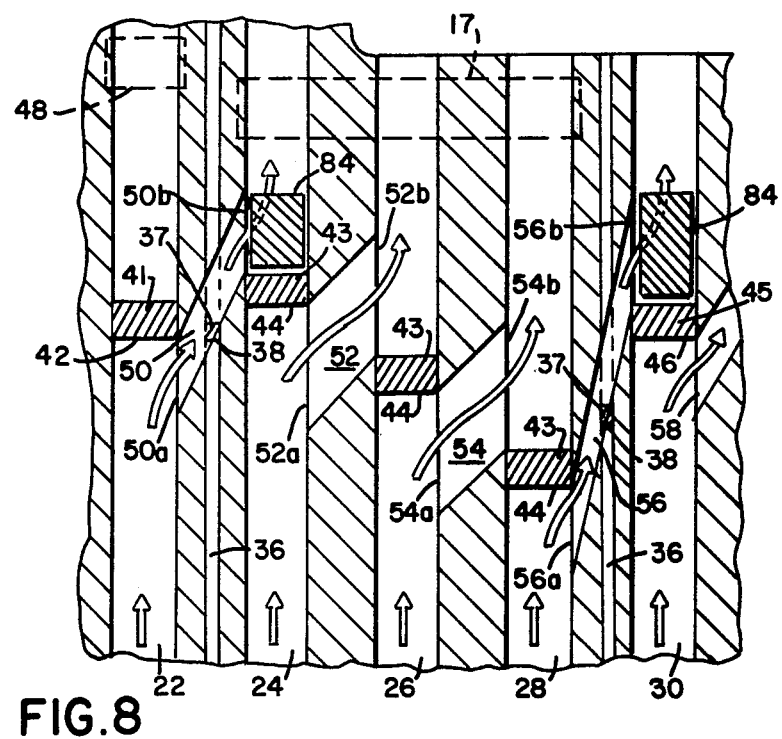
FIG. 8 is a simplified schematic view of the interconnection of the passages of the rotary processor of FIG. 7 by means of transfer grooves, with larger arrows indicating the flow direction of viscous material from one passage to another and illustrating the novel sealing means.

As illustrated schematically in FIG. 8, the passages are interconnected in series by material transfer grooves 50, 52, 54 and 56 (formed in surface 18 of housing 16) which are arranged so that material processed in one passage can be transferred to another passage for further processing. The transfer grooves and the inlets and outlets provided thereby, as well as the blocking members described below, may be provided by one or more removable transfer plates associated with housing 16, as described in commonly owned U.S. Pat. No. 4,227,816.

In the processor illustrated in FIG. 7, the devolatilizing stage communicates with vacuum manifold 76 through opening 17 through housing 16. Opening 17 extends over adjacent devolatilizing passages 24, 26 and 28. The positioning of vacuum manifold 76 about the circumference of the passages is most clearly shown in FIGS. 8-11. Vacuum manifold 76 also communicates with a vacuum source (not shown) through opening 75 to evacuate the passages of the devolatilizing stage. Manifold 76 may also communicate with a vacuum measurement means (not shown) through opening 77. The vacuum manifold illustrated in FIGS. 7-11 is preferably of the type described in above-referenced Application Ser. No. 532,156. Alternatively, any suitable means for evacuating the devolatilizing stage may be used.

The preferred devolatilizing stage for the processor illustrated in FIGS. 7-12 is described in detail in commonly owned, copending U.S. patent application Ser. No. 532,166, filed on the same day as this Application by P. S. Mehta, L. N. Valsamis and Z. Tadmor and incorporated herein by reference. Alternatively, other types of devolatilizing stage may be used such as that described in above-referenced U.S. Pat. Nos. 4,329,065 and 4,413,913.

Circumferential ribs 80 (FIGS. 7 and 9) are associated with housing 16 and are positioned at the periphery of the devolatilizing stage, to prevent vacuum line plugging in a manner described in detail in above-referenced Application No. 532,156.

Since vaporization of the volatiles in the material tends to lower the temperature of the material, the devolatilizing efficiency of the processor may be increased by providing temperature control means 82 (FIG. 7) to heat at least the side walls of the devolatilizing channels, and preferably all the channels as well as the housing of the processor. Temperature control means 82 illustrated in FIG. 7 is a series of chambers through which heat transfer fluid may be circulated in a known manner, but any suitable means to control the temperature of the material during processing may be used.

FIGS. 7 and 8 illustrate passage 22 of the feed stage. Passage 22 includes inlet 48, outlet 50a, and blocking member 41 which provides end wall surface 42 for passage 22. End wall surface 42 is preferably spaced apart from inlet 48 a major portion of the circumferential distance about the passage, and is arranged near outlet 50a. In operation, viscous material to be devolatilized is supplied gravitationally or by forced feeding to the processor by inlet 48, and is received into channel 21. The material is dragged by channel 21 toward end wall surface 42. The main body of material is held by the end wall surface so that relative motion is established between the restrained main body of material and the material adjacent the rotating walls of the channel. This relative motion results in an increase in the temperature and pressure within the material as it approaches end wall surface 42, as described in above-referenced U.S. Pat. No. 4,194,841. At end wall surface 42, the material is collected for discharge through outlet 50a and transferred to the devolatilizing stage by way of transfer groove 50 (FIG. 8), which provides outlet 50a for passage 22 and inlet 50b for partially filled, low pressure passage 24, the first passage of the devolatilizing stage, as shown in FIG. 8.

The pressure within passage 22, especially in the region of end wall surface 42 is significantly greater than that in passage 24. As mentioned, the illustrated passage 22 upstream of the devolatilizing stage is arranged to receive material fed to the processor. Alternatively, passage 22 may be arranged to perform other functions such as receiving material from upstream portions of the processor, melting or plasticating, mixing or homogenizing, conveying, pressurizing or devolatilizing material, provided a significant pressure differential exists between passages 22 and 24. Accordingly, passage 22 may be at either a significantly higher or a significantly lower pressure than passage 24.

FIGS. 7-11 illustrate the devolatilizing stage comprising three partially filled devolatilizing passages: first devolatilizing passage 24, intermediate devolatilizing passage 26 and last devolatilizing passage 28. The passage of the devolatilizing stage are low-pressure passages, since a vacuum is maintained throughout the devolatilizing stage by the vacuum source through vacuum manifold 76 and opening 17. Each devolatilizing passage includes blocking member 43 providing end wall surface 44 for the passage, to collect the material for discharge from the passage. The spacing of each blocking member 43 about the circumference of the devolatilizing stage is selected to allow optimum design characteristics for transfer grooves 50, 52, 54 and 56. A preferred arrangement of blocking members 43 and their relationships to the transfer grooves and to the inlets and outlets is schematically illustrated in FIG. 8.

Circumferential flow diverter 86 (FIGS. 7, 9, 10 and 11) is provided for each devolatilizing passage to divert material to the root surface of the devolatilizing channel to minimize vacuum line plugging, as described in above-referenced Application No. 532,156. The illustrated flow diverters 86 are part of flow diverter unit 85 (FIG. 7), but separate flow diverters may be used for each devolatilizing passage.

Transfer grooves 52 and 54 interconnect the passages of the first devolatilizing stage, as shown in FIG. 8, and provide inlet 52a and outlet 52b, and inlet 54a and outlet 54b respectively. Transfer groove 56, also shown in FIG. 8, provides outlet 56a from the devolatilizing stage and inlet 56b to mixing passage 30.

In operation, viscous material enters partially filled first devolatilizing passage 24 of the devolatilizing stage at inlet 50b (FIGS. 8 and 9), and is diverted toward the root of channel 23 by flow diverter 86. As the material passes the downstream edge of flow diverter 86 (or alternatively as it enters first devolatilizing passage 24 at inlet 50b), it is exposed to a vacuum drawn by a vacuum source (not shown) through vacuum manifold 76, causing bubbles to form throughout the volume of material as volatiles are separated from the material. The foamed material is carried through the passage toward end wall 44, where it is collected as a rapidly recirculating pool of material. Within this pool, shear is generated to rupture the bubbles and release the volatiles into passage 24 to be removed through opening 17 and vacuum manifold 76. The foamed material is discharged from passage 24 through outlet 52a and is transferred to intermediate devolatilizing passage 26 (FIGS. 8 and 10) through transfer groove 52. Some of the heat lost from the material as the volatiles vaporize is replaced as the foamed material contacts the heated surfaces of the processor, as described above. Further heating of material results from the viscous dissipation within the shearing zones as shaft power is converted to heat energy. Thus the temperature of the material is essentially constant.

From transfer groove 52, material enters intermediate devolatilizing passage 26 through inlet 52b (FIGS. 8 and 10), passes under flow diverter 86, is exposed to vacuum and is carried forward to end wall 44 for shearing and discharge through outlet 54a. Material passes through transfer groove 54 (FIG. 8), enters partially filled last devolatilizing passes 28 (FIGS. 8 and 11) through inlet 54b and passes under flow diverter 86. The foamed material is carried through passage 28 toward end wall 44 of last devolatilizing passage 28.

Figure 11:
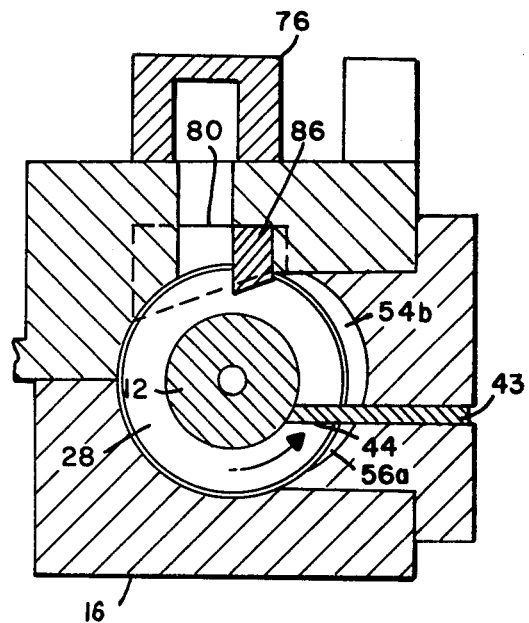
FIG. 11 is a simplified cross-sectional view of a last devolatilizing passage of the devolatilizing stage of FIG. 7, taken along line XI—XI of FIG. 7.

As the material is carried through and transferred between the devolatilizing passages, it is continually subject to vacuum and does not undergo any substantial increase in pressure, as described in above-referenced Application 532,166. Accordingly, bubbles of volatiles continue to nucleate within the material, grow and rupture as described above until the material approaches end wall 44 of last devolatilizing passage 28 (FIGS. 8 and 11). The volatiles released within the devolatilizing stage are withdrawn through vacuum manifold 76. At end wall 44 of passage 28, the material is collected for discharge from the devolatilizing stage to mixing passage 30 (FIGS. 8 and 12) through transfer groove 56 (FIG. 8), which provides outlet 56a from passage 28 and inlet 56b to passage 30. The devolatilizing stage described above has three devolatilizing passages interconnected by two transfer grooves, but more passages may be provided, depending on processing conditions and the material being processed.

Figure 12:
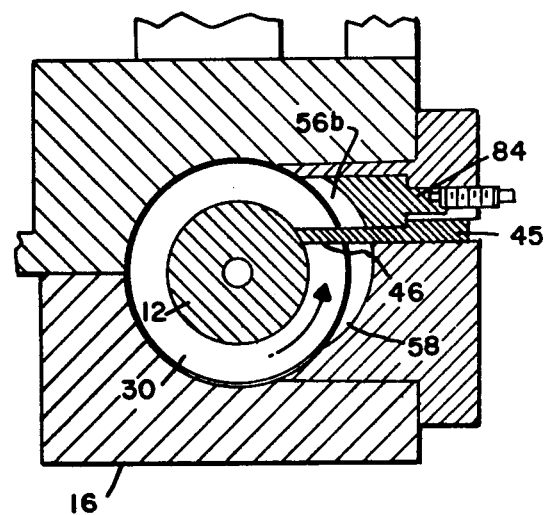
FIG. 12 is a simplified cross-sectional view of a mixing passage of the rotary processor of FIG. 7, taken along line XII—XII of FIG. 7.

Passage 30 of the mixing stage, illustrated in FIGS. 8 and 12, includes blocking member 45 providing end wall surface 46 for the passage. The end wall surface is preferably spaced apart from inlet 56b a major portion of the circumferential distance about the passage, and is arranged near outlet 58. In operation, the devolatilized material entering passage 30 is dragged by the rotating walls of channel 29 toward end wall surface 46. The main body of material is held by end wall surface 46, so that the temperature and pressure of the material is increased as it travels through the passage in a manner similar to that described for passage 22 of the feed stage. As material continues to be dragged forward toward the end wall surface, a strong circulatory motion is established in the material collected at the end wall surface, resulting in a vigorous mixing action within the material. Material collected at end wall surface 46 is discharged from passage 30 either to a further downstream passage of the processor or to a point outside the processor through outlet 58 (FIGS. 8 and 12).

The pressure within passage 30, especially in the region of end wall surface 46 is significantly greater than that in passage 28, a partially filled, low-pressure devolatilizing passage. The illustrated passage 30 downstream of the devolatilizing stage is designed for mixing of devolatilized material to provide a uniform product. Alternatively, passage 30 may be designed to perform other functions, such as conveying or pressurizing viscous material or receiving additives, or may be one passage of a further devolatilizing stage, provided a significant pressure differential exists between passages 28 and 30. Accordingly, passage 30 may be at either a significantly higher or a significantly lower pressure than passage 28.

As described above, passage 24 of the devolatilizing stage is a low-pressure passage relative to feed passage 22, since passage 24 is arranged in communication with the vacuum means through vacuum manifold 76 and opening 17. Likewise, passage 28 of the devolatilizing stage is a low-pressure passage relative to mixing passage 30. This differential in pressure existing between passages 24 and 22 and between passages 28 and 30 presents a serious problem of leakage of pressure and/or material between the passages. FIGS. 7-9 and 12 illustrate the novel sealing means of the present invention, providing effective control of this leakage problem. The novel sealing means will first be described with respect to passages 24 and 22. As shown in FIGS. 7 and 8, annular sealing groove 36 is formed in surface 20 of rotor 12 between channels 23 and 21, and is open to clearance 19 between rotor surface 20 and closure surface 18. As described above for FIGS. 1, 3 and 4, the shape of sealing groove 36 can vary, but is illustrated herein as rectangular. As illustrated schematically in FIG. 8, sealing groove 36 is open to transfer groove 50 over a portion of its length. As rotor 12 rotates, sealing groove 36 passes under transfer groove 50 where it is substantially completely filled with some of the material in transfer groove 50.

As described above, it is important that transfer groove 50 be maintained substantially completely full of viscous material during operation to control the leakage of pressure through transfer groove 50. It is equally important, as described above, that the material in transfer groove 50 be under sufficient pressure so that any portion of sealing groove 36 passing under transfer groove 50 will be filled or be maintained substantially filled with pressurized material from transfer groove 50. Accordingly, means is provided to maintain transfer groove 50 substantially completely full during operation and to provide sufficient pressure to fill sealing groove 36 with some of the pressurized material in transfer groove 50.

Figure 9:
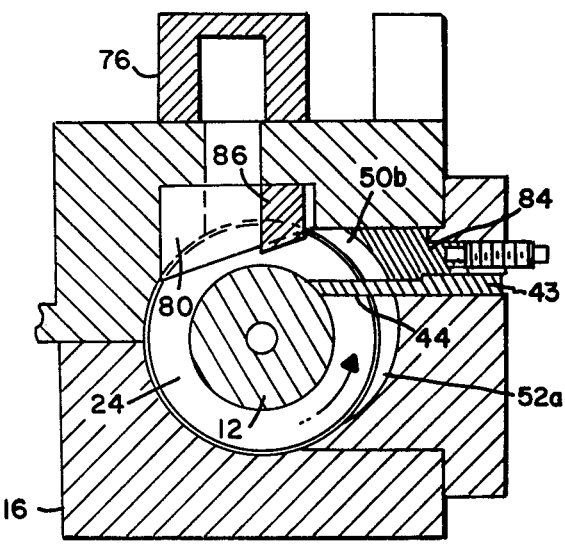
FIG. 9 is a simplified cross-sectional view of a first devolatilizing passage of the devolatilizing stage of FIG. 7, taken along line IX—IX of FIG. 7.
Figure 10:
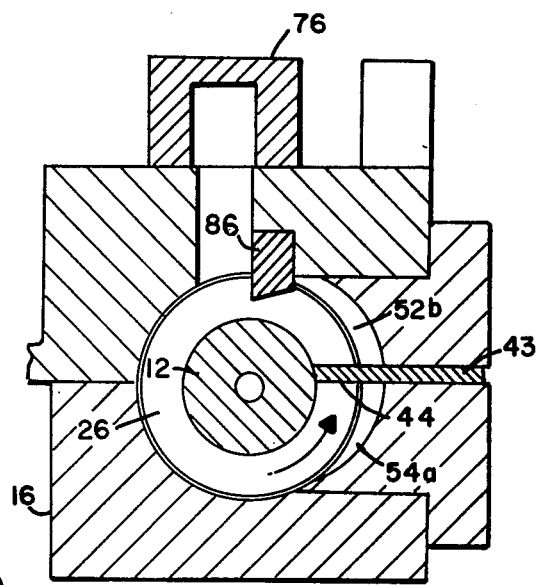
FIG. 10 is a simplified cross-sectional view of an intermediate devolatilizing passage of the devolatilizing stage of FIG. 7, taken along line X—X of FIG. 7.

Means to achieve these functions is shown in FIGS. 8 and 9 as control gate 84. Control gate 84, described in detail above with respect to FIGS. 2 and 3, provides a capability for selectively adjusting the pressure within transfer groove 50 to maintain transfer groove 50 substantially completely full during operation. This pressurization of the material in transfer groove 50 urges more material into sealing groove 36 causing pressurization of the material in sealing groove 36 as it passes under the transfer groove. Control gate 84 may thus be positioned to assure complete filling of sealing groove 36 and to provide control of the pressure within the material entering sealing groove 36 from transfer groove 50. The pressurization of the material in sealing groove 36 urges the material radially outward to contact closure surface 18, as described above with respect to FIGS. 1 through 5, forming live O-ring seal 39 between surfaces 18 and 20, and preventing the leakage of pressure and/or material through clearance 19 between passages 22 and 24 in the pressurized portion of sealing groove 36.

However, as described above, the material forming live O-ring seal 39 can experience a gradual decrease in pressure within the material carried away from transfer groove 50 by sealing groove 36. As the material is carried further from transfer groove 50, the pressure within the material may eventually decrease to a level at which the seal may be breached permitting a leak at that point between passages 22 and 24.

Means is provided for positively maintaining an effective live O-ring seal about the entire circumference of rotor surface 20 between passages 22 and 24. Such means is shown in FIG. 8 as member 37, which is arranged to pressurize material carried in sealing groove 36. Member 37 is described in detail above with respect to FIGS. 3 and 4, and provides obstructing surface 38 to block and collect material carried by sealing groove 36. As more material is carried toward obstructing surface 38 by the rotation of groove 36, further pressure is generated in the material in sealing groove 36. As this pressure builds up, it is transmitted upstream through sealing groove 36, to reinforce the pressure transmitted in the direction of rotation from transfer groove 50 to maintain continuous live O-ring seal 39 about the entire circumference of sealing groove 36, thus providing effective sealing to control pressure and/or material leakage about the entire circumference of rotor surface 20 between passages 22 and 24.

The novel sealing means described above may also be arranged to provide effective sealing between passages 28 and 30. As shown in FIGS. 7 and 8, an additional annular sealing groove 36 is formed in surface 20 of rotor 12 between channels 27 and 29, and is open to clearance 19 and to transfer groove 56 in a manner similar to that described above for sealing groove 36 and and transfer groove 50 between channels 23 and 21. As shown in FIGS. 8 and 12, an additional control gate 84 is arranged in passage 30 to provide a capability for controlling the pressure within transfer groove 56 to maintain transfer groove 56 substantially completely full during operation and to pressurize the material in transfer groove 56 and in sealing groove 36 for form live O-ring seal 39 between passages 28 and 30. An additional pressurizing member 37 providing obstructing surface 38 is arranged to extend into sealing groove 36 between passages 28 and 30. Obstructing surface 38 generates further pressure in the material in sealing groove 36 to reinforce the pressure transmitted in the direction of rotation from transfer groove 56, maintaining a continuous seal 39 about the entire circumference of sealing groove 36. Thus effective sealing is provided to control pressure and/or vacuum leakage about the entire circumference of rotor surface 20 between passages 28 and 30.

Pressurizing members 37 and obstructing surfaces 38 (FIG. 8) provide especially preferred means for maintaining effective live O-ring seals about the entire circumference of the rotor surface between passages 22 and 24 and between passages 28 and 30, thus controlling pressure and/or material leakage at the periphery of the devolatilizing stage. However, other means for maintaining effective seals at the periphery of the devolatizilizing stage are possible. An alternate means for maintaining effective live O-ring seals are described in detail above with respect to FIG. 6, and in above referenced Application No. 532,157.

The novel sealing means of this invention is also particularly effective for controlling pressure and/or material leakage at the periphery of other types types of rotary processor devolatilizing stage such as those described in above-referenced Pat. Nos. 4,329,065 and 4,413,913.

I claim:

1. A rotary processor for processing viscous materials and comprising:
   (a) a rotatable element comprising a rotor carrying at least first and second annular processing channels extending radially inwardly from the surface of the rotatable element;
   (b) a stationary element providing a coaxial closure surface spaced apart from the rotor surface by a clearance and cooperatively arranged with the channels to form at least first and second enclosed annular processing passages, the stationary element also having associated with it an inlet for introducing material to the first processing passage, a blocking member providing an end wall for each passage to collect material processed in the passage for discharge from the passage, an outlet positioned near the end wall of the second processing passage for discharging material from the second processing passage and a material transfer groove interconnecting the first and second processing passages in an in-series relationship and extending from a point near the end wall of the first processing passage to the second processing passage for discharging material from the first processing passage and transferring the discharged material to the second processing passage, and wherein a pressure differential is established between the first and second passages during operation; and
   (c) sealing means to control leakage of pressure and material between the first and second processing passages comprising:
      (1) an annular sealing groove carried by the portion of the rotor surface between the first and second processing passages, extending over the entire circumference of the rotor surface portion and arranged to pass under the material transfer groove as the rotor rotates;
      (2) means to maintain the material transfer groove substantially completely full of viscous material and to maintain the material in the material transfer groove under sufficient pressure to fill the portions of the sealing groove passing under the material transfer groove with pressurized viscous material from the material transfer groove; and
      (3) means to maintain the sealing groove substantially completely full of pressurized viscous material and to urge the material radially outward to contact the closure surface over the full circumference of the sealing groove, so that a live O-ring seal is maintained about the full circumference of the rotor surface, so that leakage of pressure and material between the first and second processing passages is controlled.

2. Apparatus of claim 1 wherein the means to maintain the material transfer groove substantially completely full of material and to maintain the material in the material transfer groove under sufficient pressure comprises a control gate associated with the stationary element and positioned axially downstream of the sealing groove to constrict the cross-sectional area available for the transfer of material to the second processing passage.

3. Apparatus of claim 1 or claim 2, wherein the means to maintain the sealing groove substantially completely full of pressurized material over the full circumference of the sealing groove comprises a pressurizing member associated with the stationary element and extending into the sealing groove at a point near the circumferentially upstream portion of the transfer groove and arranged to provide an obstructing surface for the sealing groove to at least partially obstruct the flow of material carried by the sealing groove to further pressurize the material carried by the sealing groove.

4. Apparatus of claim 1 or claim 2 further comprising vacuum means operationally communicating with at least one of the passages.

5. A rotary processor for processing viscous materials and comprising:
   (a) a rotatable element comprising a rotor carrying at least first and second annular processing channels extending radially inwardly from the surface of the rotatable element;
   (b) a stationary element providing a coaxial closure surface spaced apart from the rotor surface by a clearance and cooperatively arranged with the channels to form at least first and second enclosed annular processing passages, the stationary element also having associated with it an inlet for introducing material to the first processing passage, a blocking member providing an end wall for each passage to collect material processed in the passage for discharge from the passage, an outlet positioned near the end wall of the second processing passage for discharging material from the second processing passage and a material transfer groove interconnecting the first and second processing passages in an in-series relationship and extending from a point near the end wall of the first processing passage to the second processing passage for discharging material from the first processing passage and transferring the discharged material to the second processing passage, and wherein a pressure differential is established between the first and second passages during operation; and
   (c) sealing means to control leakage of pressure and material between the first and second processing passages comprising:
      (1) an annular sealing groove carried by the portion of the rotor surface between the first and second processing passages, extending over the entire circumference of the rotor surface portion and arranged to pass under the material transfer groove as the rotor rotates;
      (2) a control gate associated with the stationary element and positioned axially downstream of the sealing groove to constrict the cross-sectional area available for the transfer of material to the second processing passage so that the material within the transfer groove and upstream of the control gate is pressurized, providing complete filling of the transfer groove and complete filling of the sealing groove with pressurized viscous material from the transfer groove; and
      (3) a pressurizing member associated with the stationary element and extending into the sealing groove at a point adjacent the circumferentially upstream portion of the transfer groove and arranged to provide an obstructing surface for the sealing groove to at least partially obstruct the flow of material carried by the sealing groove and to maintain the sealing groove substantially completely full of pressurized viscous material and to urge the material radially outward to contact the closure surface over the full circumference of the sealing groove, so that a live O-ring seal is maintained about the full circumference of the rotor surface, so that leakage of pressure and material between the first and second processing passages is controlled.

6. A rotary processor for processing viscous liquid materials containing volatiles dispersed therein and comprising:
(a) a rotatable element comprising a rotor carrying at least three annular processing channels extending radially inwardly from the surface of the rotatable element.
(b) a stationary element providing a coaxial closure surface spaced apart from the rotor surface by a clearance and cooperatively arranged with the channels to provide enclosed annular processing passages, each processing passage having an inlet for introducing the viscous material to the passage, a blocking member providing an end wall for the passage to collect the material processed in the passage for discharge from the passage and an outlet positioned near the end wall of the passage for discharging the material from the passage, all associated with the stationary element, which also has associated with it material transfer grooves providing at least some of the inlets and outlets, interconnecting the processing passages in an in-series relationship and extending from a point near the end wall of one processing passage to an adjacent processing passage for discharging the material from the one processing passage and transferring the discharged material to the adjacent processing passage; and wherein:
(c) the processing passages provide a plurality of processing stages, including:
  (1) a devolatilizing stage for devolatilizing the viscous material processing in the rotary processor and including one or more of the processing passages arranged to operationally communicate with a vacuum means so that the volatiles may be separated from the material during operation and released into the passage(s) of the devolatilizing stage for removal from the processor by the vacuum means;
  (2) a first additional processing stage upstream of and adjacent the devolatilizing stage and including at least one of the processing passages; and
  (3) a second additional processing stage downstream of and adjacent the devolatilizing stage and including at least one of the processing passages; and wherein
  (4) evacuation of the devolatilizing stage effects a pressure differential between the devolatilizing stage and the first additional processing stage, and between the devolatilizing stage and the second additional processing stage; and further comprising:
(d) sealing means to control leakage of pressure and material between the devolatilizing stage and the first additional processing stage, and between the devolatilizing stage and the second additional processing stage comprising:
  (1) annular sealing grooves carried by the portions of the rotor surface between the devolatilizing stage and the first additional processing stage and between the devolatilizing stage and the second additional processing stage, extending over the entire circumference of the rotor surface portions and arranged to pass under the material transfer grooves interconnecting the stages as the rotor rotates;
  (2) control gates associated with the stationary element and positioned axially downstream of each sealing groove to constrict the cross-sectional area available for the transfer of material between the stages so that the material within the transfer grooves interconnecting the stages and upstream of each control gate is pressurized, providing complete filling of the transfer grooves interconnecting the stages and complete filling of the sealing grooves with pressurized viscous material from the transfer grooves; and
  (3) pressurizing members associated with the stationary element and extending into each sealing groove at points adjacent the circumferentially upstream portion of the transfer grooves and arranged to provide an obstructing surface for each sealing groove to at least partially obstruct the flow of material carried by each sealing groove and to maintain each sealing groove substantially completely full of pressurized viscous material and to urge the material radially outward to contact the closure surface over the full circumference of each sealing groove, so that live O-ring, seals are maintained about the full circumference of the rotor surface between the stages, so that leakage of pressure and material between the devolatilizing stage and the first additional processing stage, and between the devolatilizing stage and the second additional processing stage is controlled.

* * * * *